(12) United States Patent
Blanding et al.

(10) Patent No.: US 7,916,408 B2
(45) Date of Patent: Mar. 29, 2011

(54) X-Y ADJUSTABLE OPTICAL MOUNT

(75) Inventors: Douglass L Blanding, Painted Post, NY (US); Jack W Frankovich, Fairport, NY (US); Keith E Hanford, Macedon, NY (US); Kevin J Magierski, Victor, NY (US)

(73) Assignee: Corning Incorporated, Corning, NY (US)

( * ) Notice: Subject to any disclaimer, the term of this patent is extended or adjusted under 35 U.S.C. 154(b) by 252 days.

(21) Appl. No.: 12/261,644

(22) Filed: Oct. 30, 2008

(65) Prior Publication Data

US 2010/0110570 A1    May 6, 2010

(51) Int. Cl.
*G02B 7/02*    (2006.01)
(52) U.S. Cl. ......... 359/813; 359/811; 359/819; 359/822
(58) Field of Classification Search .................... 359/813
See application file for complete search history.

(56) References Cited

U.S. PATENT DOCUMENTS

| | | | |
|---|---|---|---|
| 2,937,571 A | 10/1957 | Thompson | |
| 5,172,276 A * | 12/1992 | Ueyama et al. | 359/813 |
| 5,249,197 A | 9/1993 | Kittell | |
| 5,363,244 A * | 11/1994 | Bender et al. | 359/823 |
| 5,973,856 A * | 10/1999 | Kanbara | 359/694 |
| 5,986,827 A * | 11/1999 | Hale | 359/822 |
| 6,191,898 B1 | 2/2001 | Trunz et al. | |
| 6,388,823 B1 | 5/2002 | Gaber et al. | |
| 6,757,113 B1 | 6/2004 | Basavanhally et al. | |
| 6,765,733 B1 * | 7/2004 | Igl et al. | 359/822 |
| 7,515,364 B2 * | 4/2009 | Takahashi | 359/813 |
| 2002/0067555 A1 | 6/2002 | Rau et al. | |
| 2005/0248860 A1* | 11/2005 | Soemers et al. | 359/849 |

FOREIGN PATENT DOCUMENTS

WO      2007/062794 A1    6/2007

* cited by examiner

*Primary Examiner* — Jessica T Stultz
(74) *Attorney, Agent, or Firm* — Timothy M. Schaeberle (57) ABSTRACT

An optical element mount has an inner member suspended within an outer member by a plurality of flexures. A first and a second translational adjustment apparatus are disposed to translate the inner member within a translation plane that is orthogonal to an optical axis, wherein each translational adjustment apparatus has an actuator movable within the outer member along a linear travel path that is parallel to the translation plane and a shaft extending between the outer and inner members, the shaft coupled to the actuator with a first ball-and-socket joint and coupled to the inner member with a second ball-and-socket joint. The linear travel path of the actuator for the first translational adjustment apparatus is substantially orthogonal to the linear travel path of the actuator for the second translational adjustment apparatus.

17 Claims, 12 Drawing Sheets

FIGURE 8

X-Y ADJUSTABLE OPTICAL MOUNT

CROSS REFERENCE TO RELATED APPLICATIONS

Reference is made to U.S. patent application Ser. No. 12/072,631 filed Feb. 27, 2007, entitled "Monolithic Optical Mount" by Blanding et al.

FIELD OF THE INVENTION

This invention generally relates to component mounting and more particularly relates to a mount for an optical element that allows adjustable translation within a plane orthogonal to the optical axis.

BACKGROUND

Photolithography or microlithography apparatus are widely used in the fabrication of microelectronic semiconductor devices and other microdevices. In photolithography, an optical system directs light energy to record a pattern at high resolution and with precise registration onto a photosensitive layer formed on a silicon wafer or other substrate. Continuing improvements in miniaturization place increasingly more challenging demands on the performance and accuracy of the optical system used for this function. Microlithography optical systems are fairly large and complex, containing a number of optical elements. A stacked annuli lens assembly arrangement is preferred for this type of optical apparatus, as described, for example, in U.S. Pat. No. 5,428,482 entitled "Decoupled Mount for Optical Element and Stacked Annuli Assembly" to Bruning et al.

Lenses of very high quality are used for microlithography. Typically, these lenses (known as "stepper lenses") comprise a number of elements, where each lens element is very accurately mounted in a cylindrical shaped "cell" made of stainless steel. Each of these cells is fabricated to extremely tight tolerances. Mating surfaces, for example, are ground flat and parallel, so that when the lens is assembled each successive cell is bolted to the face of the adjacent cell with little or no adjustment possible. Once all the cells have been assembled, the entire lens is tested and any unwanted aberrations or image defects are discovered.

In practice, after a lens is completely assembled for the first time, it is often determined through rigorous testing that one or more of the elements must be moved slightly in the X or Y direction in order to correct the measured optical defect. This type of adjustment must be accomplished without adversely affecting the position of nearby components and without changing the position of the lens element along the optical axis. In some cases, this type of correction entails disassembly of the lens assembly, re-adjustment of lens position, re-assembly, and re-testing. As is well known to those skilled in optical fabrication, this can be a costly and time-consuming procedure subject to human error.

An alternate strategy that accommodates the need to make X-Y centering adjustments relates to design of the lens cell itself, with an inner ring connected to an outer mount. This approach is used, for example, in the complex optical mount disclosed in U.S. Pat. No. 6,191,898 entitled "Optical Imaging Device, Particularly an Objective, with at Least One Optical Element" to Trunz et al. The outer mount in this type of design supports the structure and mounts to adjacent cells in the lens assembly and the inner ring carries the lens element to be adjusted. One or more opposing adjustment screws are then used to urge the inner ring to a preferred position within the X-Y plane that is orthogonal to the optical axis (Z axis).

Although solutions using an inner ring supported within an outer mount can alleviate the need to disassemble the lens assembly when adjustment within the X-Y plane is required, there are drawbacks to this type of approach, in practice. Conventional solutions of this type can be subject to frictional forces and surface slippage during adjustment, which can contribute to undesirable and unpredictable parasitic motion, so that adjustments that are made in order to shift the position of the inner ring along one direction result in unwanted motion relative to the orthogonal direction. The amount of unwanted motion can be difficult to predict from one adjustment to the next and depends on numerous factors such as the surface contour and finish and relative rotational position of the actuator screw or other actuator shaft for both the driven and the unmoved actuator, the angle of contact between the driven and non-driven actuators and the inner ring, and the beginning and ending positions in the X-Y plane.

Thus, when using a conventional arrangement of actuators for adjusting X-Y plane positioning, results may not be satisfactory. Unwanted effects of frictional forces and variations in surface geometry at the mechanical interfaces can cause some amount of parasitic motion upon adjustment that is difficult to predict. A number of the conventional solutions proposed for X-Y plane adjustment are fairly complex and include a large number of components, increasing the risk of introducing unwanted parasitic motion when adjustments are made.

SUMMARY

It is an object of the present disclosure to advance the art of lens mounting and adjustment. With this object in mind, the present disclosure provides an optical element mount comprising:

an inner member suspended within an outer member by a plurality of flexures; and a first translational adjustment apparatus and a second translational adjustment apparatus disposed to translate the inner member within a translation plane that is orthogonal to an optical axis, wherein each translational adjustment apparatus comprises:

(i) an actuator movable within the outer member along a linear travel path that is parallel to the translation plane;

(ii) a shaft extending between the outer and inner members, the shaft coupled to the actuator with a first ball-and-socket joint and coupled to the inner member with a second ball-and-socket joint;

wherein the linear travel path of the actuator for the first translational adjustment apparatus is substantially orthogonal to the linear travel path of the actuator for the second translational adjustment apparatus.

The optical element mount disclosed herein provides an adjustable X-Y translational motion.

One advantage of the optical element mount is that it provides controllable translational motion with reduced friction and more predictable parasitic motion over alternative mounting approaches.

One further advantage of the optical element mount is that it provides translational motion with reduced stress on the movable component.

DETAILED DESCRIPTION

Figures shown and described herein are provided in order to illustrate key principles of operation and fabrication for lens mount devices and actuator mechanisms according to various embodiments and a number of these figures are not drawn with intent to show actual size or scale. Some exaggeration may be necessary in order to emphasize basic structural relationships or principles of operation.

In the context of the present disclosure, terms "top" and "bottom" are relative and do not indicate any necessary orientation of a surface, but are used simply to refer to and distinguish opposite surfaces for a component or block of material.

Figure 1:
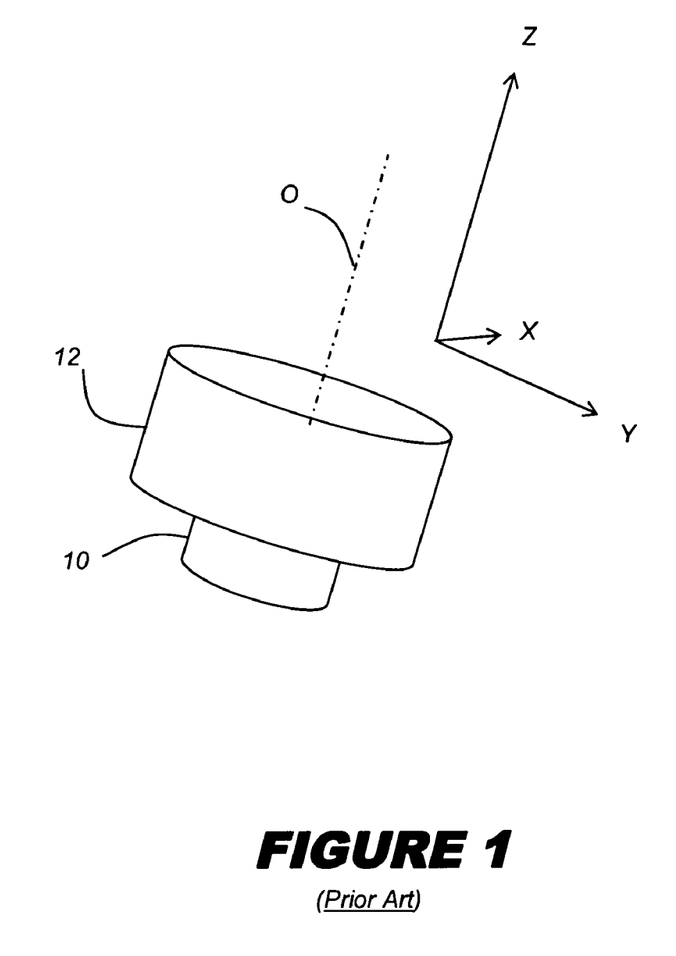
FIG. 1 is a perspective view showing the overall function of an ideal lens mount relative to standard coordinate axes.

Referring to FIG. 1, there is shown an inner member, lens holder 10, in a frame 12, with reference XYZ axes designations as commonly used for microlithography lens apparatus and other lens assemblies. The Z axis corresponds to the optical axis O. The optical element mount of various embodiments uses the overall arrangement shown in FIG. 1 and provides an apparatus that allows a measure of adjustment of the relative position of lens holder 10 along the X-Y plane, orthogonal to the optical (Z) axis.

It is known in the field of optical design and precision mechanics that flexures can be used to connect two bodies in order to define certain patterns of constraints, thereby allowing certain desired degrees of freedom (DOF) between the two bodies, while constraining or inhibiting others.

Figure 2A:
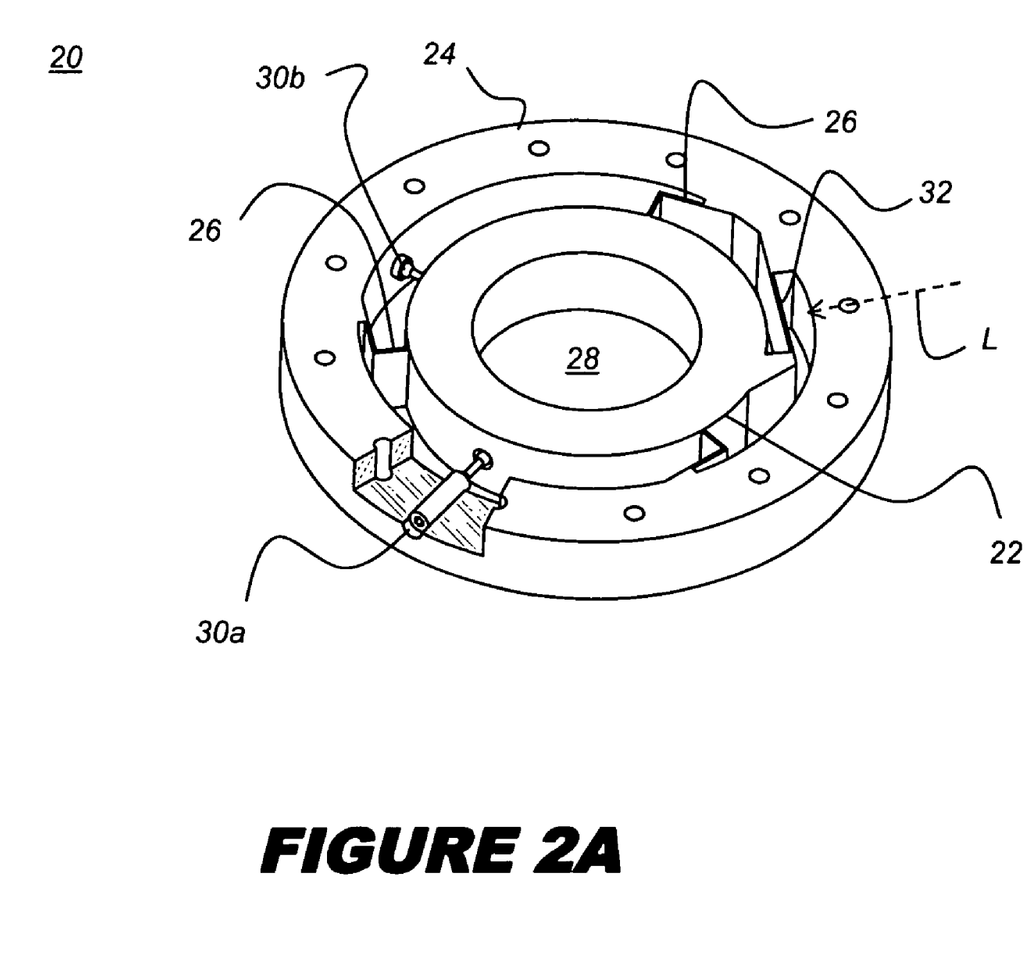
FIGS. 2A and 2B show a perspective view of an optical element mount with an inner member suspended within an outer member by a series of flexures.
Figure 2B:
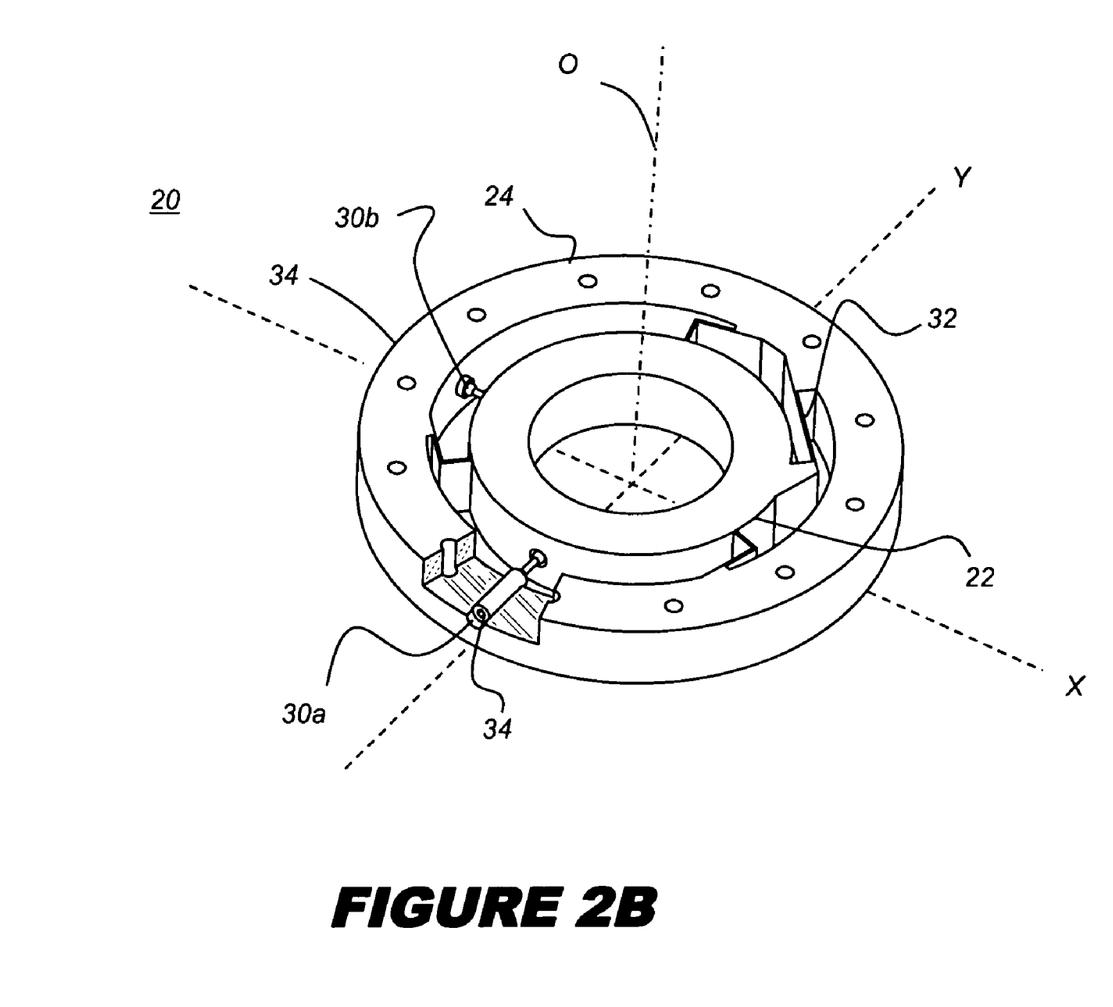

The perspective views of FIGS. 2A and 2B show an optical element mount 20 using flexures according to one embodiment. Optical element mount 20 has an inner member 22 suspended within an outer member 24 by an arrangement of flexures 26. With respect to FIG. 1, inner member 22 corresponds to lens holder 10 and can be used to hold a lens, mirror, prism, film, diffraction grating, or other optical element along optical axis O; outer member 24 corresponds to frame 12, used for fastening to other optical element mounts within the annular ring in a microlithography lens apparatus, for example. Flexures 26 are of the folded sheet type in the embodiment shown in FIGS. 2A and 2B. A folded sheet flexure, more simply termed a fold flexure in the present application, provides a single constraint along the line of its fold. The embodiment shown employs an arrangement of fold flexure constraints having their folds oriented parallel to the optical axis O to rigidly constrain Z-axis movement and to constrain rotation about X and Y axes. A tangential flexure 32, substantially circumferential with respect to inner member 22 and the optical axis O, provides a tangential constraint for Z-axis rotation. Two degrees of freedom, along X and Y axes, remain between inner member 22 and outer member 24. A first translational adjustment apparatus 30a and a second translational adjustment apparatus 30b are provided, with a cut-away portion of outer member 24 removed to allow better visibility of translational adjustment apparatus 30a, as shown. An orifice 28 is provided within inner member 22 for an embodiment that mounts a lens element. A loading force L, as indicated by the dashed-line arrow, is generally provided by a spring, flexure, or other mechanism not shown in FIGS. 2A and 2B, but described subsequently.

Figure 3:
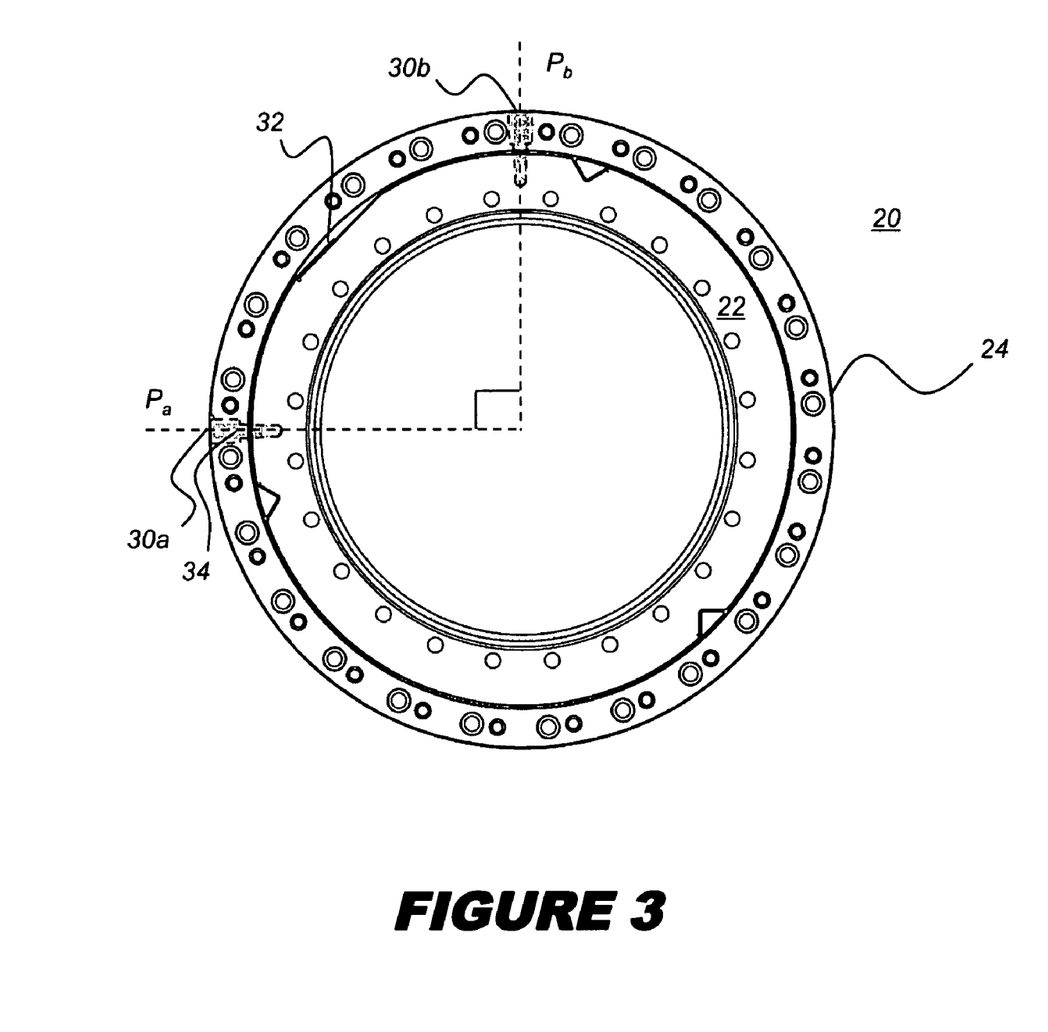
FIG. 3 is a plan view showing an optical element mount with orthogonally disposed translational adjustment apparatus.

The perspective view of FIG. 2B shows optical element mount 20 relative to reference X-Y axes and optical axis O. As shown in this figure, and subsequently in the plan view of FIG. 3, actuators 34 of translational adjustment apparatus 30a and translational adjustment apparatus 30b have linear travel paths, $P_a$ and $P_b$, respectively, in the X-Y plane that are substantially orthogonal to each other, that is, typically orthogonal to within +/−1 degree, but diverging from true orthogonal by no more than about +/−10 degrees, in optical element mount 20. As close as possible to true orthogonal is preferred, since such an arrangement reduces the likelihood and effects of mechanical crosstalk when adjustments are made.

Figure 4:
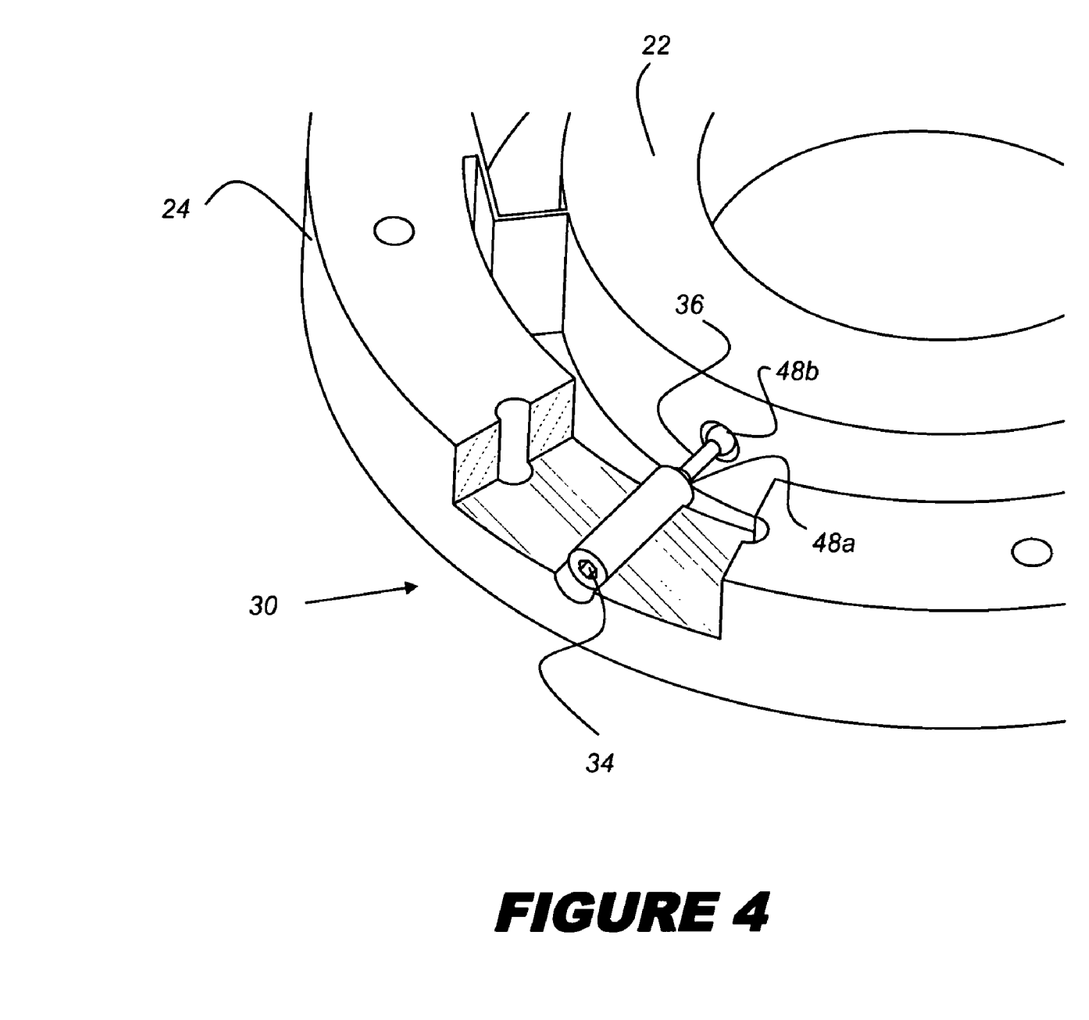
FIG. 4 is an enlarged perspective cutaway view showing a single translational adjustment apparatus.

The perspective view of FIG. 4 shows a close-up of a translational adjustment apparatus 30. This device includes an actuator 34 such as an adjustment screw that is coupled to a shaft 36 that extends between actuator 34 and inner member 22. At each end, shaft 36 is coupled using ball-and-socket joints 48a and 48b. The arrangement of orthogonal adjustment mechanisms using this type of coupling provides a translation apparatus that exhibits reduced friction and closely controlled, predictable parasitic motion, as described in more detail subsequently.

The sequence of FIGS. 5A, 5B, 5C, and 5D shows schematically how translational adjustment apparatus 30a and translational adjustment apparatus 30b cooperate to provide controllable movement of inner member 22 to various positions along the X-Y plane or translation plane. A loading member 46, such as a spring, flexure, or other loading device, is represented schematically in FIGS. 5A-5D, working in conjunction with tangential flexure 32.

In each translational adjustment apparatus 30a, 30b, actuator 34 is coupled to shaft 36 at a ball-and-socket joint 48a. Similarly, the coupling of shaft 36 to inner member 22 is also of the ball-and-socket type, labeled as 48b. Actuator 34 can be an adjustment screw as represented in the embodiment of FIGS. 5A-5D or may be some other type of linear actuator, such as a magnetically- or motor-driven or piezoelectrically driven actuator, for example. Actuator 34 drives one end of shaft 36 against the loading force of loading member 46. This use of a loading force helps to maintain shaft 36 nested in contact against both actuator 34 and inner member 22.

Figure 5A:
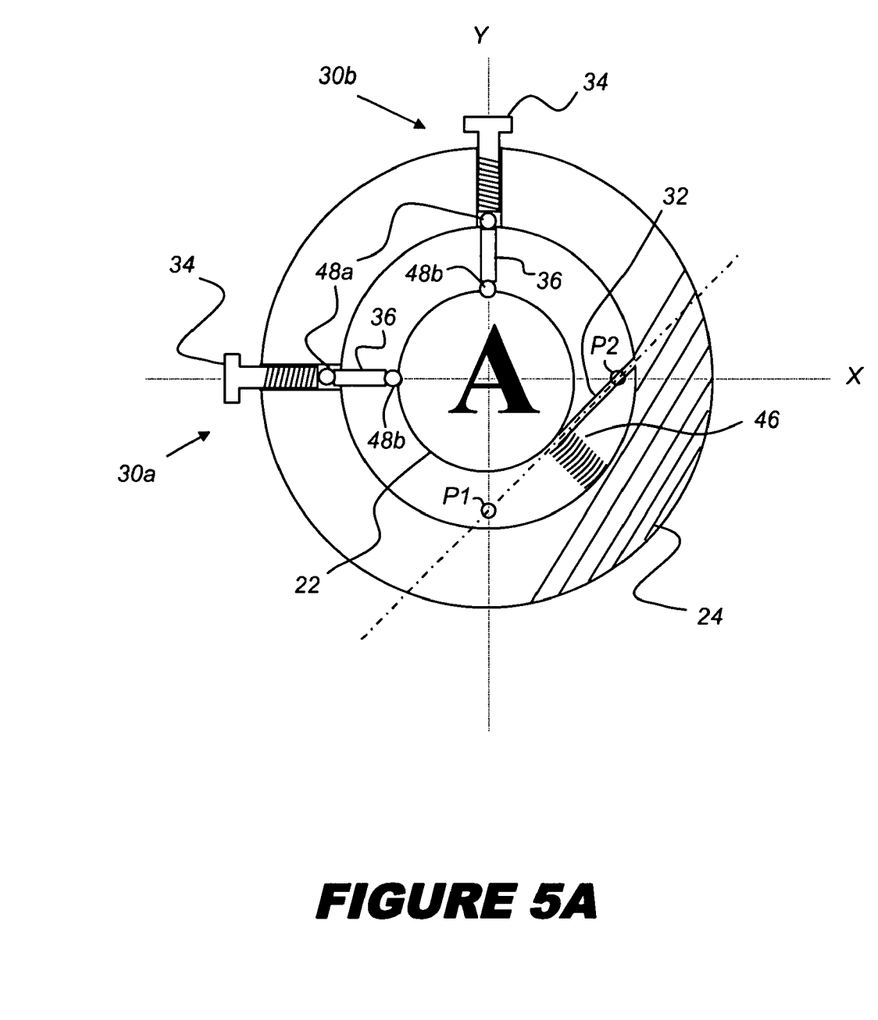
FIGS. 5A, 5B, 5C, and 5D are schematic plan views showing operation of the translational adjustment apparatus to move inner member to various positions along a translation plane that is in the plane of the page.

The rotational motion of the ball-and-socket coupling 48a or 48b at each end of shaft 36 helps to reduce the effects of static friction or "stiction" at the mechanical interfaces during X-Y adjustment. In FIG. 5A, both shafts 36 are shown substantially orthogonal to each other, with inner member 22 substantially centered within outer member 24. The letter "A" is shown for reference in FIGS. 5A-5D as a guide to help show the relative movement of inner member 22 from one figure to the next. For clarity, inner member 22 is represented here as solid, without any type of orifice. Movement of inner member 22 is by rotation about points P1 and P2, shown where a center line along flexure 32 intersects with orthogonal X and Y axes, as indicated. For the purpose of showing how movement is effected, there is a relatively large gap shown between inner and outer members 22 and 24 in these figures. Relative movement is exaggerated in FIGS. 5B-5D and spring and flexure components are represented schematically in order to describe more clearly how the mechanism works.

Figure 5B:
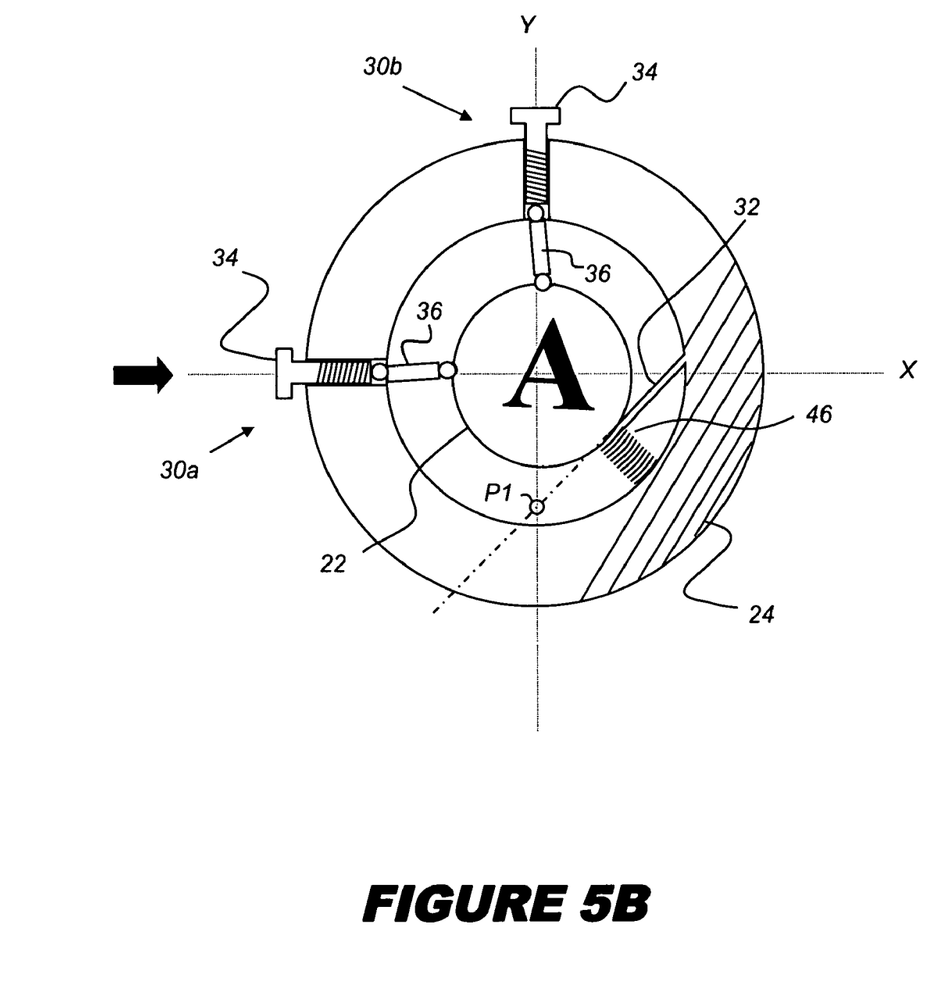

In FIG. 5B, actuator 34 at translational adjustment apparatus 30a is driven inward, toward inner member 22, as indicated by the dark arrow; actuator 34 at translational adjustment apparatus 30b is stationary. This movement causes displacement of inner member 22 slightly to the right and downward, with slight rotation about point P1. The respective shafts 36 may no longer be orthogonal to each other.

Figure 5C:
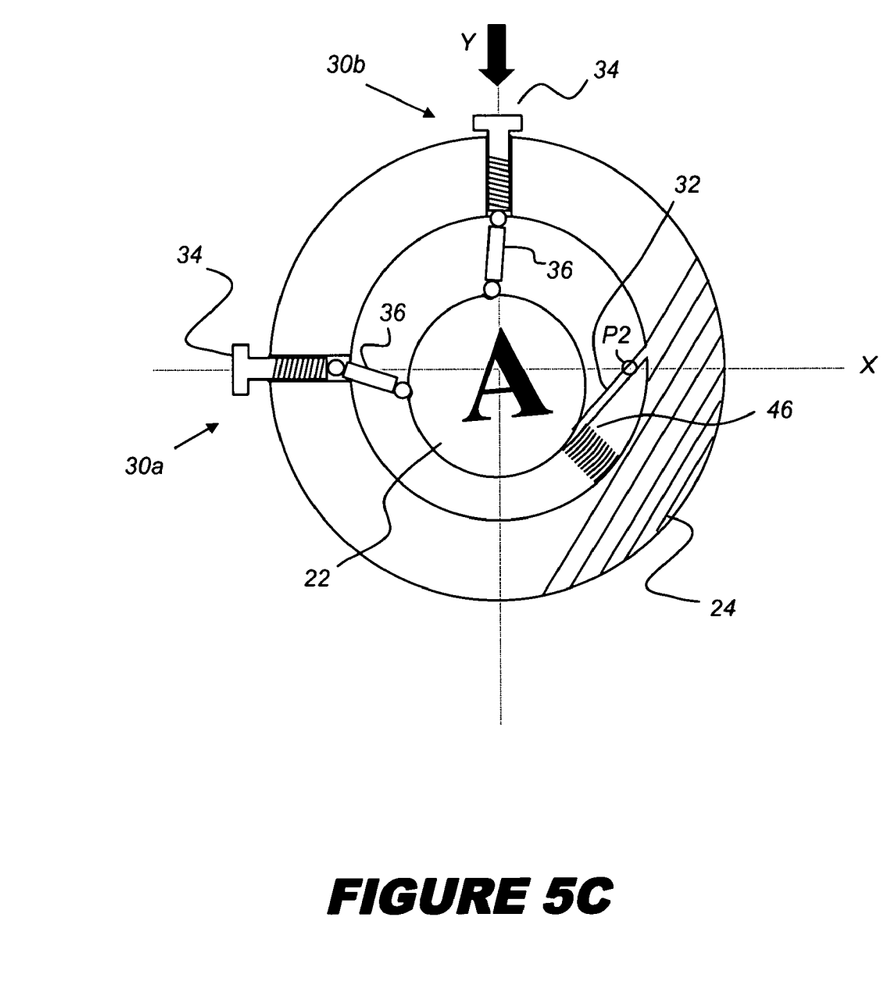

In FIG. 5C, actuator 34 at translational adjustment apparatus 30b is driven inward, toward inner member 22, as indicated by the dark arrow; actuator 34 at translational adjustment apparatus 30a is stationary. This adjustment effects slight movement downward and rotation of inner member 22 about point P2.

Figure 5D:
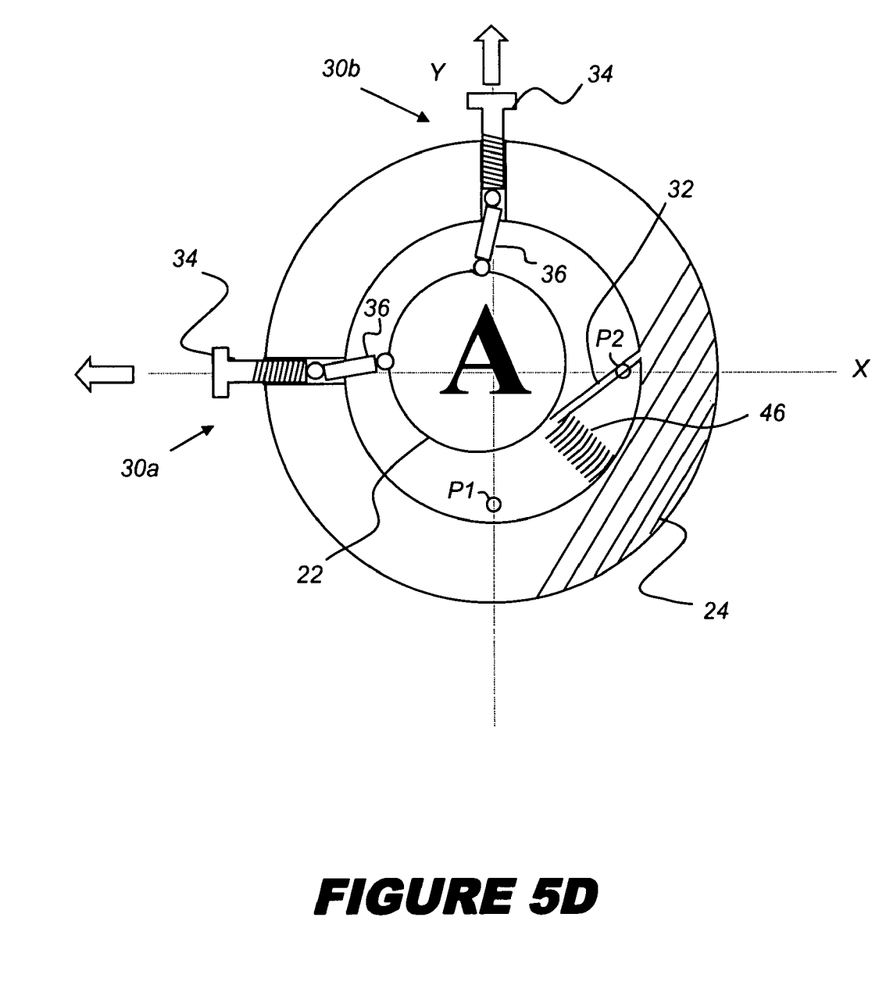

In FIG. 5D, both actuators 34 are retracted or driven outward, as indicated by the outlined arrows, causing more pronounced movement of inner member 22, upward and to the left. Rotation is shown about both points P1 and P2 for this type of adjustment.

As shown in FIGS. 5B-5D, each shaft 36 effectively behaves as a type of "wobble rod" with this arrangement, advantageously providing smooth motion of inner member 22 from one position in the X-Y plane to the next. The use of shaft 36 as an intermediary element between actuator 34 and inner member 22, and its configuration with dual ball-and-socket coupling, reduces static frictional forces that would be encountered in making adjustments using conventional actuation schemes.

Figure 6:
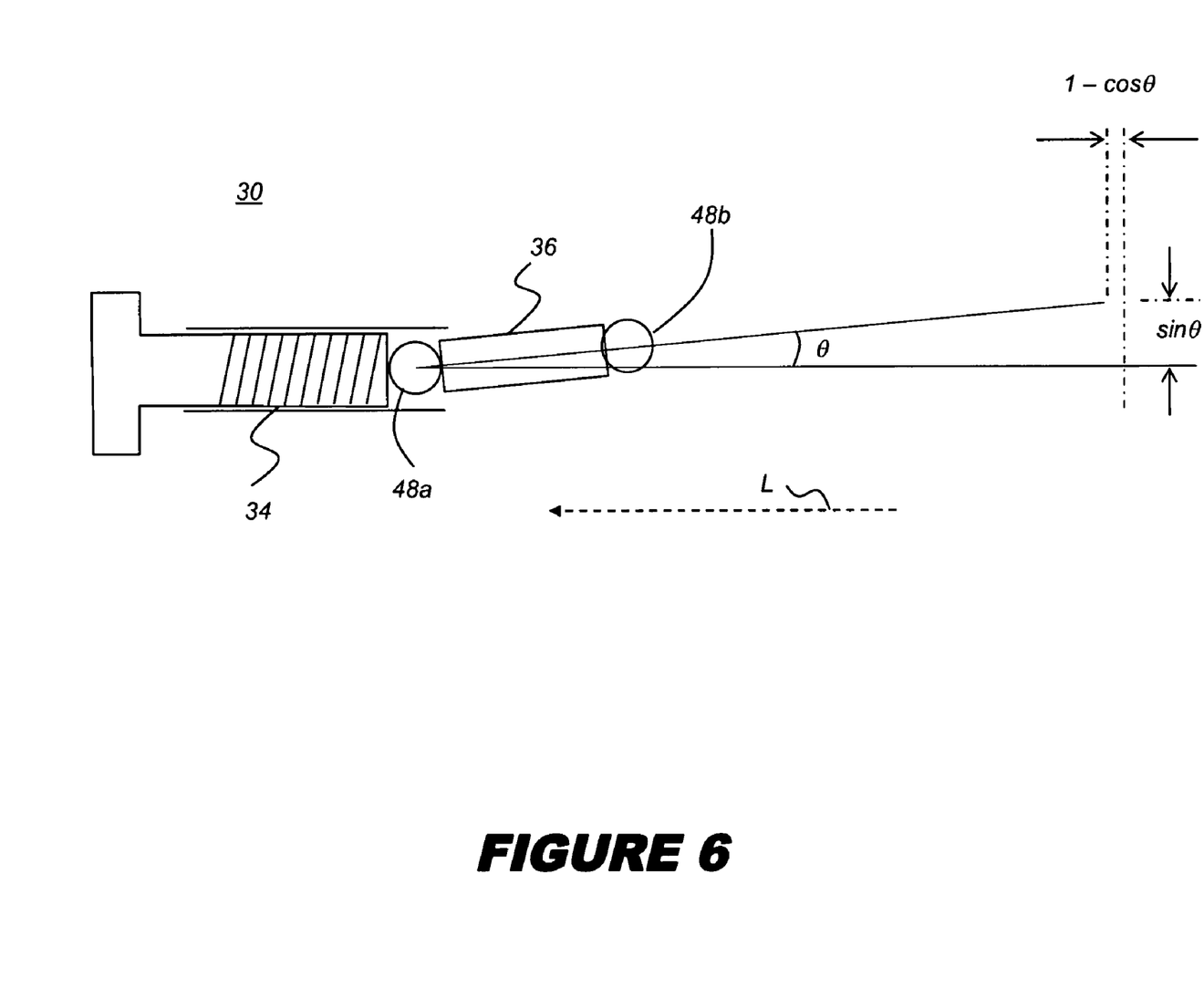
FIG. 6 is a schematic side view of a translational adjustment apparatus showing components of motion, including parasitic motion.

As has been noted earlier, another advantage of the translation adjustment apparatus of one embodiment relates to prediction and control of parasitic motion when adjustment is made. The dual ball-and-socket arrangement of this embodiment allows parasitic motion to be substantially quantified and controlled when inner member 22 moves from one position to the next. The schematic view of FIG. 6 shows the significant component of parasitic motion with translational adjustment apparatus 30. An adjustment at one translational adjustment apparatus 30 causes an angular change $\theta$ in the relative position of shaft 36 at the other translational adjustment apparatus 30. Movement relative to one orthogonal axis is of magnitude $(\sin \theta)$. Movement along the other orthogonal axis is $(1-\cos \theta)$.

The loading force that is provided by loading member 46, described with reference to FIGS. 5A-5D and labeled L in FIG. 6, can be implemented in a number of ways. Gravity, for example, can be used as a loading force, so that a separate spring element is not needed. In other embodiments, however, some type of spring, such as a leaf or coil spring, for example, or other loading mechanism is used to apply a mechanical loading force that acts against both first translational adjustment apparatus 30a and second translational adjustment apparatus 30b. Configurations using flexures could also be used to provide the loading force of loading member 46. However, it would generally be undesirable to apply any type of compressive force directly against inner member 22, since this could cause distortion of an optical component that is supported therein. Thus, for example, the arrangement of loading member 46 in the simplified schematic of FIGS. 5A-5D, while it illustrates schematically the general principle and direction of the needed loading force, could be unsatisfactory if applied in practice; compressive force directly applied from loading member 46 could cause some distortion of a lens mounted in inner member 22.

As a solution to this problem, applying a loading force L that is coaxial with actuator 34 would be most advantageous; since this would not apply compressive force directly onto inner member 22. This can be difficult to achieve in practice; however, some approximation to coaxial loading force is also acceptable.

Figure 7:
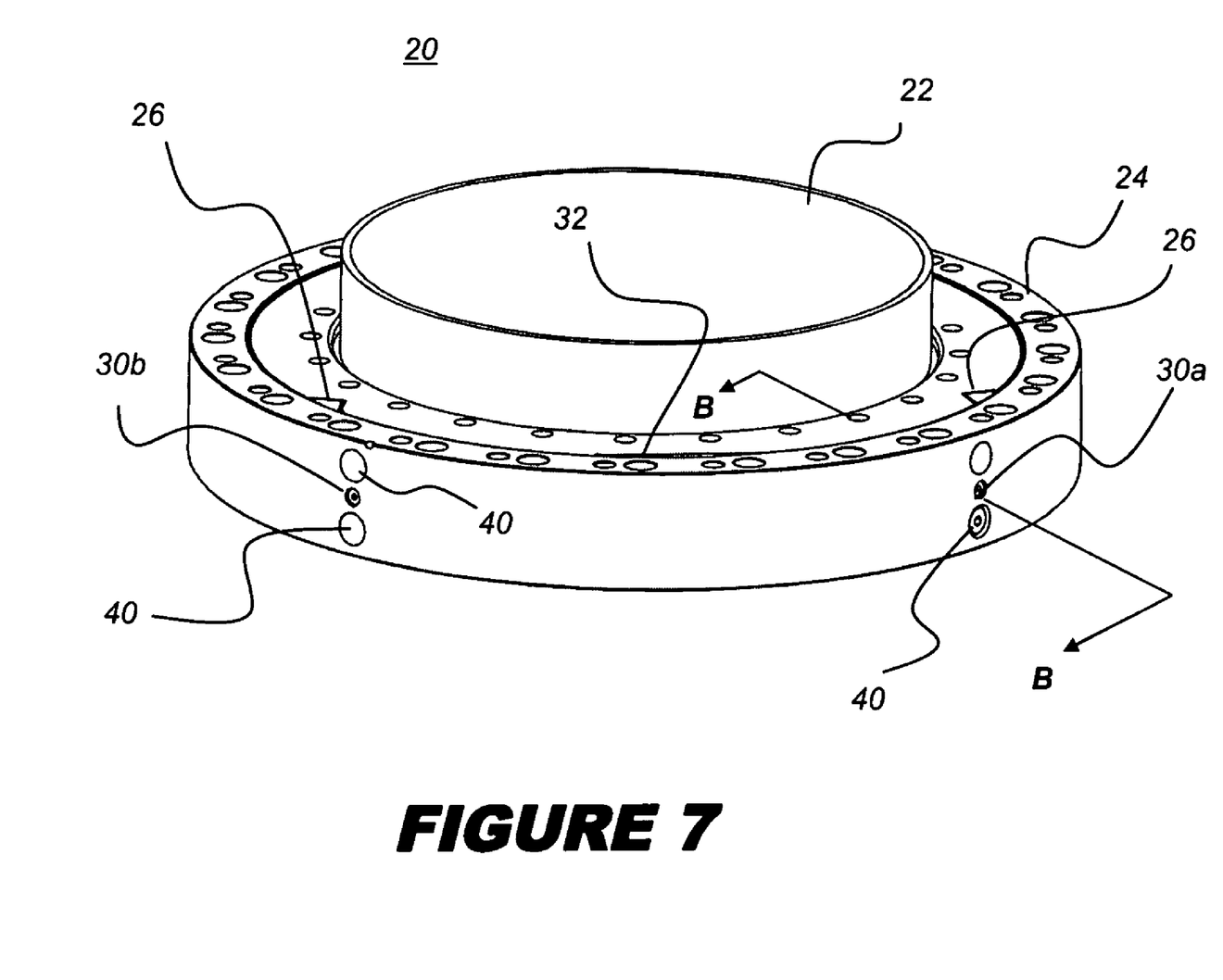
FIG. 7 is a perspective view of an optical element mount in a monolithic embodiment.
Figure 8:
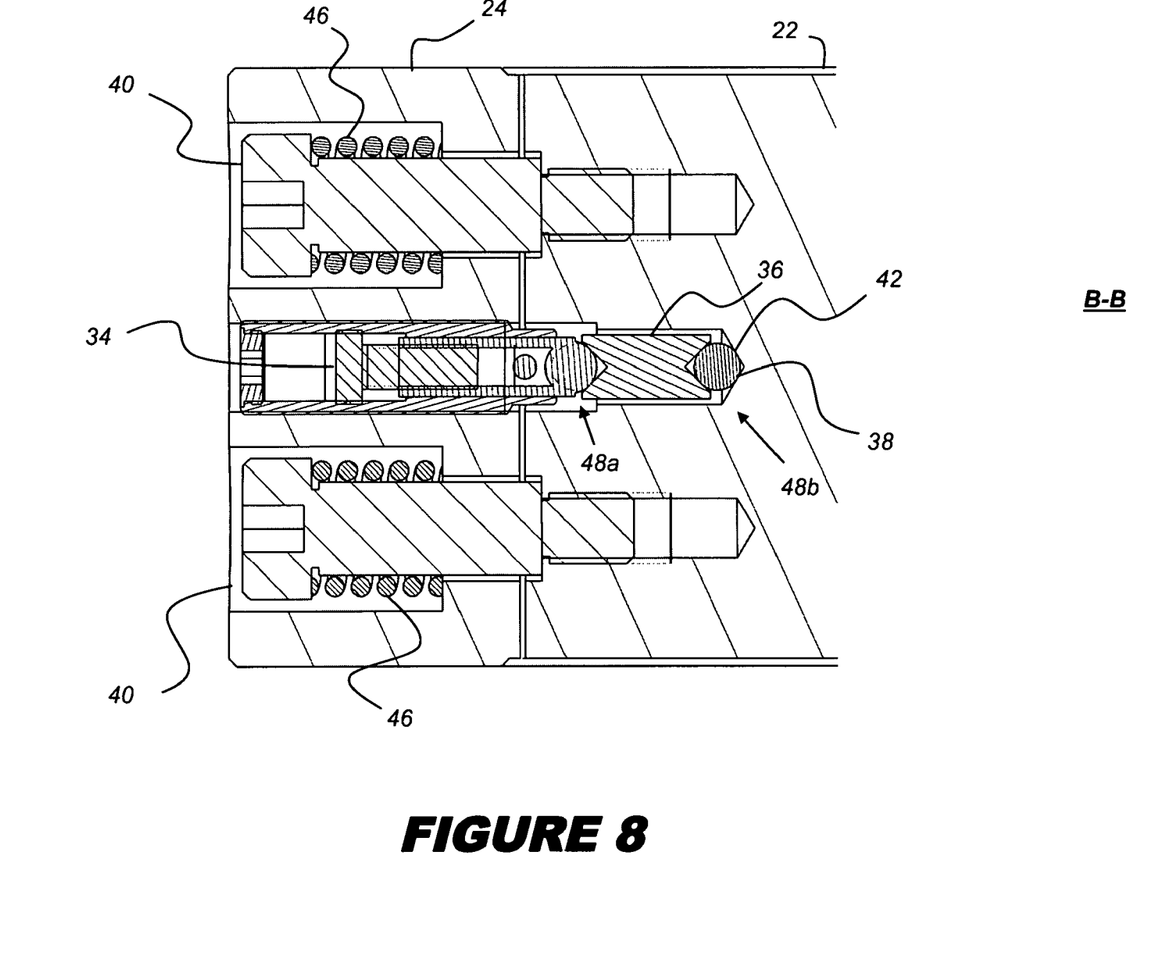
FIG. 8 is an enlarged cross section of a translational adjustment apparatus that uses a pair of springs as loading members in one embodiment.

The perspective view of FIG. 7 and enlarged cross-sectional view of FIG. 8 show an embodiment of optical element mount 20 that approximates coaxial loading, employing springs as loading members 46, with a pair of springs positioned in chambers 40 that are closely adjacent to each translational adjustment apparatus 30a, 30b. Springs used in this embodiment can be compression springs, applying a loading force against a resistance, or extension springs. Spring tension or other loading force can be adjustable, using adjustment screws, for example. As was shown in the example embodiment of FIG. 3, tangential flexure 32 for this embodiment lies within the substantially orthogonal angle formed by translational adjustment apparatus 30a and 30b. Fold flexures 26 are also used for suspending inner member 22 with respect to outer member 24 in the FIG. 7 embodiment.

Ball-and-Socket Variations

Ball-and-socket couplings of a variety of types are known in the mechanical arts. There are a number of possible embodiments for ball-and-socket connection at each end of shaft 36. The embodiment of FIG. 8 shows shaft 36 having a generally conical socket that seats a spherical element 38. This provides a low-friction coupling to a corresponding socket 42 in inner member 22. A similar coupling could be used at the other end of shaft 36. In other embodiments, shaft 36 is rounded on one or both ends, or is provided with a rounded or spherical contact surface, for example.

Monolithic Embodiments

Various embodiments of optical element mount 20 provide a kinematic mount mechanism for a lens or other optical element that is advantaged over conventional lens mount designs when inner element 22, outer element 24, and flexures 26 and 32 are monolithically constituted, either formed subtractively by forming an arrangement of cavities in a single block of material or formed additively by any of a number of techniques that deposit material in a pattern to form a single part. This single-part assembly provides an arrangement of flexures that suspend an inner member or lens holder from an outer member or frame, such as was described earlier with respect to FIGS. 2A and 2B. Single-part construction has advantages for eliminating problems such as those caused by thermal coefficient differences and fastener fabrication and assembly. Overall, a single-part machined lens mount assembly would have reduced mechanical stress over other types of lens mounts. A single part allows simpler handling, assembly, and mounting for constructing an optical assembly. Advantageously, a monolithically formed optical element mount has built-in alignment.

Using machining techniques made possible by Computerized Numerical Control (CNC), highly accurate and repeatable machining can be performed to provide single-part construction. EDM (Electrical Discharge Machining) is one specialized form of CNC machining that can be used for precision fabrication of complex parts from metal and other hard, conductive materials. Briefly, EDM selectively erodes material from a workpiece of a conductive substance using an electrical discharge across the gap between an electrode and the material to be removed. A dielectric fluid continually flows in the gap area around the electrode and flushes out the removed material. Wire EDM is one form of EDM, using a continuously moving wire as its electrode. Other techniques that may be suitable for fabricating a monolithic component can include conventional machining, laser machining, various etching techniques, water jets, and machining technologies in general that remove material from a solid block, forming and shaping cavities of defined dimensions, controlling their overall contour and depth.

The material used for a monolithic optical element mount 20 can be any suitable material for the type of application and fabrication method that is used, including stainless steel, aluminum, or some other metal or any of a number of types of polymers such as plastics, ceramics, or other materials that allow the necessary degree of flexure. For EDM use, a conductive material is required. Orifice or opening 28 can be formed initially within the block of material, using lower-cost machining methods, for example.

With some materials, optical element mount 20 can be a molded part or can be formed by additive methods, including material deposition, for example. Any of a number of rapid prototyping techniques could be used to provide a monolithic structure. Some examples of rapid-prototyping technologies that could be employed for fabrication of optical element mount 20 include Selective Laser Sintering (SLS), stereolithography, and a host of other techniques that fabricate solid structures in an additive fashion. These techniques deposit a single material in a pattern that forms inner member 22 within outer member 24 and forms fold flexures 26 extended between them.

Optical element mount 20 may also have advantages for providing its arrangement of constraints in applications other than photolithography. When its inner and outer elements are formed as a monolithic structure, the kinematic mount mechanism can be precision-fabricated, eliminating a significant amount of assembly and adjustment needed with conventional lens mounting devices and also minimizing unwanted thermal effects.

Configurations of an optical element mount have been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, while optical element mount 20 is well-suited to photolithography applications, this mount can be used in any of a number of other applications for which X-Y translation is required. The optical element that is mounted within inner member 22 is a spherical lens in one embodiment, so that X-Y positional adjustment helps to provide the necessary lens centering. However, this optical element can be any suitable type of refractive, reflective, prismatic, film, or other optical component. As another option, inner member 22, described herein primarily as a lens holder, could serve as the optical element itself, such as by being treated with a reflective coating, for example. Fold flexures 26 can have any of a number of arrangements, provided that their folds are parallel to the optical axis. Inner and outer members 22 and 24 can have any suitable shape, with inner member 22 generally cylindrical and symmetric about optical axis O. However, symmetry about this axis is not required.

It should be noted that the mathematical definition of a cylinder includes not only the familiar right circular cylinder, but also any number of other shapes whose outer surface can be defined by moving a straight line parallel to a fixed straight line, wherein the moving straight line intersects a fixed planar closed curve or base. Although cylindrical shapes are shown for inner and outer members 22 and 24 in the exemplary embodiments of FIG. 2A and following, either or both of these components could be non-cylindrical in shape.

Advantageously, the optical element mount of different embodiments provides translational motion with a well-defined and predictable component of parasitic motion. Because translational adjustment apparatus 30a and 30b are disposed substantially orthogonally with respect to each other, overconstraint and opposing forces against the inner member are reduced over that encountered with conventional solutions, such as those that apply adjustment forces at 120-degree angles to each other, for example. Friction is dramatically reduced over that of conventional translation apparatus, due to the dual ball-and-socket coupling provided by shafts at each translational adjustment apparatus.

Thus, what is provided is a mount for an optical element that allows translational movement in a plane that is perpendicular to an optical axis.

What is claimed is:

1. An optical element mount comprising:
   an inner member suspended within an outer member by a plurality of flexures; and
   a first translational adjustment apparatus and a second translational adjustment apparatus disposed to translate the inner member within a translation plane that is orthogonal to an optical axis, wherein each translational adjustment apparatus comprises:
   (i) an actuator movable within the outer member along a linear travel path that is parallel to the translation plane;
   (ii) a shaft extending between the outer and inner members, the shaft coupled to the actuator with a first ball-and-socket joint and coupled to the inner member with a second ball-and-socket joint;
   wherein the linear travel path of the actuator for the first translational adjustment apparatus is substantially orthogonal to the linear travel path of the actuator for the second translational adjustment apparatus.

2. The optical element mount of claim 1 wherein the inner member and outer member and the plurality of flexures are monolithically formed.

3. The optical element mount of claim 1 wherein the outer member is substantially cylindrical.

4. The optical element mount of claim 1 wherein the inner member is substantially cylindrical.

5. The optical element mount of claim 1 wherein the inner member has an orifice.

6. The optical element mount of claim 1 wherein the inner member holds an optical element taken from the group consisting of a refractive element, a reflective element, a prism, a diffraction grating, and a film.

7. The optical element mount of claim 1 wherein the inner member is symmetric about the optical axis.

8. The monolithic optical element mount of claim 2 formed of a material taken from the group consisting of stainless steel and aluminum.

9. The optical element mount of claim 1 further comprising a loading member exerting a loading force that urges the inner member toward the outer member.

10. The optical element mount of claim 9 wherein the loading member is a leaf spring or a coil spring.

11. The optical element mount of claim 1 wherein the actuator comprises an adjustment screw.

12. The optical element mount of claim 1 wherein the actuator is taken from the group consisting of a magnetically-driven actuator, a motor-driven actuator, and a piezoelectrically driven actuator.

13. A method for mounting an optical element comprising:
   a) suspending an inner member within an outer member by a plurality of flexures;
   b) extending a first shaft between a first actuator that is disposed in the outer member and a first socket formed in the inner member, wherein the first shaft has a ball-and-socket coupling at each end;
   c) extending a second shaft between a second actuator that is disposed in the outer member and a second socket formed in the inner member, wherein the second shaft has a ball-and-socket coupling at each end; and
   d) providing a loading force that nests the ends of the first and second shafts in contact with their respective actuators and with the inner member.

14. The method of claim 13 wherein a first travel path of the first actuator and a second travel path of the second actuator are substantially orthogonal to each other within the same plane.

15. The method of claim 13 wherein providing a loading force comprises providing a leaf spring.

16. The method of claim 13 wherein providing a loading force comprises providing a coil spring.

17. The method of claim 13 further comprising mounting an optical element to the inner member.

* * * * *